United States Patent [19]

Williams

[11] Patent Number: 4,941,974
[45] Date of Patent: Jul. 17, 1990

[54] METHOD OF MAKING LIQUID CHROMATOGRAPHY DUAL ZONE PACKING MATERIALS

[75] Inventor: Dwight E. Williams, Midland, Mich.

[73] Assignee: Dow Corning Corporation, Midland, Mich.

[21] Appl. No.: 335,885

[22] Filed: Apr. 10, 1989

Related U.S. Application Data

[62] Division of Ser. No. 212,100, Jun. 27, 1988, Pat. No. 4,855,054, which is a division of Ser. No. 63,147, Jun. 17, 1987, Pat. No. 4,773,994.

[51] Int. Cl.$^5$ .............................................. B01D 15/08
[52] U.S. Cl. ............................ 210/198.2; 210/502.1; 210/656; 502/401; 502/439
[58] Field of Search ...................... 210/635, 656, 198.2, 210/502.1; 436/161, 162; 502/401, 402, 403, 404, 439; 530/413, 417

[56] References Cited

U.S. PATENT DOCUMENTS

| | | | |
|---|---|---|---|
| 3,207,699 | 9/1965 | Harding et al. | 252/430 |
| 3,839,395 | 10/1974 | Otsuka | 260/463 |
| 3,960,720 | 6/1976 | Porath | 210/635 |
| 3,984,349 | 10/1976 | Meiller et al. | 252/428 |
| 4,061,503 | 12/1977 | Berger et al. | 106/300 Q |
| 4,062,693 | 12/1977 | Berger | 106/300 Q |
| 4,105,465 | 8/1988 | Abbott | 252/428 |
| 4,233,366 | 11/1980 | Sample, Jr. et al. | 428/405 |
| 4,324,689 | 4/1982 | Shah | 252/428 |
| 4,379,931 | 4/1983 | Plueddemann | 546/14 |
| 4,539,399 | 9/1985 | Armstrong | 210/502.1 |
| 4,540,486 | 9/1985 | Ramsden | 210/178.2 |
| 4,544,485 | 10/1985 | Pinkerton | 210/502.1 |
| 4,624,932 | 11/1986 | Bogoch | 530/417 |
| 4,675,384 | 6/1987 | Dromard et al. | 530/417 |

OTHER PUBLICATIONS

Boksanyi et al., Advances in Coll. and Int. Sci., vol. 6 (1976), pp. 95–132.
Chang, "High Speed Ion Exchange Chromatography of Proteins", Anal. Chem., vol. 48, No. 18, Nov. 1976, pp. 1839–1845.
Chmielowiec et al., J. of Coll. and Int. Sci., vol. 94, No. 2, Aug. 1983, pp. 319–320.
Hagestam et al., "Internal Surface Reversed-Phase Silica Supports For Liquid Chromatography", Analytical Chem., vol. 57 (1985), pp. 1757+.
Hagestam et al., "Internal Surface Reversed-Phase Silica Support Prepared with Chymotrypsin", Journal of Chrom., vol. 351 (1986), pp. 239–248.
Hertl et al., J. Phys. Chem., vol. 75, No. 14, 1971, pp. 2181–2185.
Hunnicutt et al., "Reactivity of Organosilane Reagents on Microparticulate Silica", Anal. Chem., vol. 58 (1986), pp. 748–752.
Snyder et al., Intro. to Modern Liq. Chrom., 2nd Ed., Wiley Interscience, NY, 1979.
Marshall et al., "Synthesis of LC Reversed Phases of Higher Efficiency by Initial Partial Deactivation of the Silica Surface", J. of Chrom. Sci., vol. 22, June 1984, pp. 217–220.
Poole, C. F., Recent Advances in Silylation of Organic Compounds for Gas Chromatography, Chap. 4, King, Heyden, London, 1977, pp. 152–200.
Szczerba et al., "HPLC Column Finds Drugs in Serum", Research & Dev., Sept. 1986, pp. 84–86.
Williams et al., Silica: Surfaces to Interfaces, D. E. Leyden et al., Gordon & Brench publishers, 1986, p. 471 ff.

*Primary Examiner*—Ernest G. Therkorn
*Attorney, Agent, or Firm*—Killworth, Gottman, Hagan & Schaeff

[57] ABSTRACT

Dual zone reverse phase packing materials for use in liquid chromatographic blood serum analysis are prepared by contacting a porous support, such as porous silica, with a fluorocarbon silane, such as a perfluorobutylsilyl compound, to form a lipophobic phase in the external zone of the porous support, and, then contacting the porous support with a lipophilic silane, such as an octadecylsilyl compound, to form a lipophilic partitioning phase in the internal zone of the porous support. Ketal blocked diol groups, which later may be hydrolyzed to diol groups, are also attached to both zones of the packing materials. The dual zone reverse phase packing materials display a reduced degree of serum protein adsorption in the external zone while drug substances are retained and separated by the lipophilic partitioning phase in the internal zone.

13 Claims, No Drawings

METHOD OF MAKING LIQUID CHROMATOGRAPHY DUAL ZONE PACKING MATERIALS

CROSS-REFERENCE TO RELATED APPLICATIONS

This is a divisional of application Ser. No. 212,100, filed Jun. 27, 1988, now U.S. Pat. No. 4,855,054, which in turn is a divisional of application Ser. No. 063,147, filed Jun. 17, 1987, now U.S. Pat. No. 4,773,994.

BACKGROUND OF THE INVENTION

The present invention relates to liquid chromatography packing materials, and more particularly it relates to an improved reverse phase packing material for use in blood serum analysis and to a method for making and using such a packing material.

The use of liquid chromatography as a means for blood serum analysis has become quite popular. Liquid chromatography using a reverse phase packing material has been found to be an effective tool in both qualitative and quantitative analysis for drug substances in blood, serum, or plasma. Typically the reverse phase packing material is made up of bonded alkyl silica and most typically the packing is a porous silica having an octadecylsilane (ODS) bonded to it.

Work has recently been done on improving the efficiency of ODS bonded silica packings. See, for example, Marshall et al. "Synthesis of L. C. Reversed Phases of Higher Efficiency by Initial Partial Deactivation of the Silica Surface," *Journal of Chromatography Science*, Vol. 22., Jun. 1984, pp. 217-220, where it is suggested that pretreating silica with a small amount of end-capping reagent (such as trimethylchlorosilane), followed by exhaustive octadecylation, yields reverse phase packings of higher efficiency.

Although the efficiency of such packing materials is good, they have a limited life. While ODS packings absorb drug substances from the sample, they also absorb proteinaceous substances which tend to interfere with fractionation of the drug substance from other solutes contained in the sample. This eventually leads to a complete fouling of the chromatographic column. Therefore, it has previously been necessary to carry out a preliminary sample preparation procedure to remove the troublesome proteins.

In the most conventional way, the proteins are precipitated, the aqueous supernatant is extracted with a water-immiscible organic solvent, the organic solvent is removed from the extract by evaporation, and the analyte residue is reconstituted in mobile phase before analysis by high-pressure liquid chromatography (HPLC). This method is very time-consuming and cost-inefficient.

A second method currently employed involves the adsorption of analytes onto a reverse phase packing of octadecylsilane bonded to silica in a small disposable column. Although this technique can be automated, the columns can be used for only one sample because proteins remain on the packing, and as a result the technique is also cost-inefficient for multiple samples.

In a third method, a reverse phase packing of octadecylsilane bonded to silica is introduced into a precolumn, which is separated from, but connectable to, an analytical column by a switching valve arrangement. Serum samples are injected directly into the precolumn, where the proteins are denatured and accumulated, and the deproteinated analyte solution is passed into the analytical column for fractionation. After approximately three injections, the precolumn must be backflushed to remove the protein residue. This interruptive backflush is time-inefficient for a large number of samples. Furthermore, the octadecylsilane packing eventually deteriorates because proteins cannot be completely removed therefrom.

The three above-mentioned techniques are discussed in Pinkerton et al U.S. Pat. No. 4,544,485. Pinkerton et al discloses an improvement in the form of "internal surface reversed phase" (ISRP) packing materials. The Pinkerton ISRP packings, and variations thereof, are described not only in Pinkerton Pat. No. 4,544,485, but also Hagestam, I. and Pinkerton, T., "Internal Surface Reversed-Phase Silica Supports for Liquid Chromatography", *Analytical Chemistry*, Vol. 57, 1985, pp. 1757+; Szczerba et al, "HPLC Column Finds Drugs in Serum", *Research & Development*, Sept. 1986, pp. 84-86; and Hagestam, I. and Pinkerton, T., "Internal Surface Reversed-Phase Silica Support Prepared with Chymotrypsin", *Journal of Chromatography*, Vol. 351, 1986, pp. 239-248.

Basically, the Pinkerton patent and publications state that the Pinkerton ISRP packing materials allow for the direct injection of serum samples into the chromatographic column, thus eliminating time-consuming preparation required to rid samples of the proteins that can clog pores and interfere with the quality of separations in conventional ODS reverse phase liquid chromatography. The Pinkerton ISRP packing materials are described as having a hydrophobic partitioning phase present only on the internal surfaces of the porous silica support, while a hydrophilic phase, which is non-adsorptive to proteins, covers the external surfaces. Serum proteins, being too large to enter into the pores of the support, "see" only the non-adsorptive hydrophilic external phase and elute rapidly in the interstitial void volume giving the column a larger useful life. The small hydrophobic analytes, on the other hand, can penetrate into the porous interior of the support and interact with the hydrophobic partitioning phase.

Generally, the Pinkerton ISRP packing materials are prepared by taking porous silica having glycerolpropyl groups bonded thereto, covalently bonding a hydrophobic polypeptide to some fraction of the glycerolpropyl groups, and then treating the bonded silica with an enzyme which cleaves the hydrophobic polypeptide from the external surface but not the internal surface. Two methods for producing the Pinkerton ISRP packing materials have been described in the above-mentioned literature. The first involves binding a hydrophobic glycyl-L-phenylalanyl-L-phenylalanine (Gly-L-phe-L-phe) tripeptide to the surface of glycerolpropyl bonded porous silica particles. This is followed by enzymatic cleavage of the phenylalanine moieties on the external surface via carboxypeptidase A. In the second method, a butoxy-L-phenylalanine (boc-L-phe) partitioning phase is bound to an alkylamine bonded silica support. The enzyme chrymotrypsin is then utilized to cleave the boc-L-phe phase from the external surface, and the remaining external residual alkylamine groups are capped with glycidol.

However, even with the Pinkerton ISRP packing materials it has been found desirable to use a "guard column", i.e. a small disposable cartridge packed with spherical ISRP materials, to prolong the ISRP column life. See, for example, page 86 of the Szczerba et al article mentioned above.

Accordingly, while the concept of a dual internal surface/external surface silica packing, such as the Pinkerton ISRP packing materials, is a good one, improved packing materials having an even longer life would be desirable.

SUMMARY OF THE INVENTION

The present invention meets that need by providing dual zone packing materials having a longer useful life when used for reverse phase liquid chromatographic blood serum and other biological fluid analysis. The packing materials of the instant invention are made by a process which utilizes the principle of pore-diffusion control of the rate of surface silylation. As disclosed in U.S. application Ser. No. 901,349, filed Aug. 28, 1986, now abandoned and assigned to the same assignee as the present invention, ultrafast silylating agents have been found which silylate the external surface more rapidly than they diffuse into the internal surface of porous silica. See also, Williams & Tangney, *Silanes, Surfaces & Interfaces*, D. E. Leyden, ed., Gordon & Breach, publisher, 1986, p. 471 ff. As disclosed in application Ser. No. 901,349, the disclosure of which is hereby incorporated by reference, pore-diffusion control makes possible the creation of dual surface materials (more properly termed "dual zone" materials) which allow independent adjustment of surface energy or transport properties and internal chemical function via spatially separated immobilized groups.

Thus, with pore diffusion control it is possible to use much less than saturating amounts of a rapidly reacting silane which is consumed by reaction essentially with only the hydroxyls on the external surface of porous silica, and then use a second silane which diffuses into the pores of the porous silica and reacts with the remaining hydroxyls which are primarily on the internal surface of the porous silica. This produces an internal zone which has different properties from the external zone in the same manner that the Pinkerton ISRP materials have dual surface characteristics. Suprisingly, however, when the pore-diffusion principle is applied to production of internal surface reverse phase packings, packing materials having an extended useful life are produced.

The preferred process for producing the dual zone reverse phase packing materials of the present invention involves the following steps:

(1) A hydroxyl-bearing porous support, such as a porous silica, is contacted with less than a saturating amount of fluorocarbon silane having the formula $L_mMe_{3-m}SiC_2H_4C_nF_{2n+1}$ wherein L is SR an alkyl sulfide. A substituted amino n or a substituted amido such as N-methylacetamido, Me is methyl (i.e. CH$_3$), n is 1 or more, and m is 1-3. Preferably the fluorocarbon silane is perfluorobutylethylenedimethylsilyl-N-methylacetamide. Fluorocarbon silanes of this nature rapidly react with and covalently bond to the hydroxyl groups on the external surface of the porous support. This forms a lipophobic fluorocarbon phase in the external zone of the porous support which rejects proteinaceous substances in an analyte such as blood serum.

(2) Thereafter, the porous support is contacted with a lipophilic silane having the formula $C_nH_{2n+1}Me_x$-$SiL_{3-x}$ wherein $n+x \geq 5$, Me is methyl, and L is a halo group such as chloro, an amino group such as dimethylamino, an alkoxy such as diethoxy, an amido such as N-methylacetamido, or a carboxy such as acetoxy. Preferably the lipophilic silane is octadecyldimethylsilyl-N-methylacetamide. The lipophilic silane diffuses into the interior of the porous support and covalently bonds to the hydroxyl groups on the internal surface of the porous support. This forms a lipophilic partitioning phase of the usual ODS reverse phase type in the internal zone of the porous support.

(3) Because it is desirable to use less than a saturating amount of lipophilic silane in step 2, residual hydroxyl groups (i.e. silanols in the case of a silica support) remain on the porous support. In this step, then, the porous support is contacted with a ketal silane having the formula

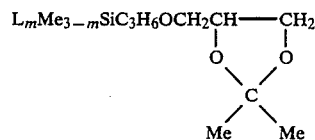

wherein L is chloro, a substituted amino or N-methylacetamido, Me is methyl and m is 1-3. Preferably the ketal silane is

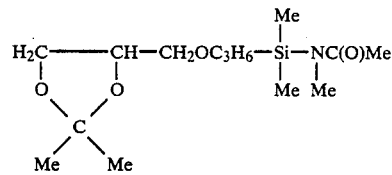

Ketal silanes of this type may be prepared by the method disclosed in copending application Ser. No. 914,899, filed Oct. 3, 1986, and assigned to the same assignee as the present invention. The disclosure of that copending application is hereby specifically incorporated by reference.

(4) Optionally, an end-capping treatment with a trimethylsilyl reagent, may next be used to end-cap the remaining hydroxyl groups (silanols) in both the internal and external zone.

(5) Finally, the ketal blocked diol groups formed by step 3 are optionally hydrolyzed, with for example H$_2$SO$_4$, to cleave the ketal groups and form diol groups on the porous support. Preferably the diol is

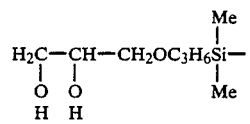

These diol groups in the external zone further help prevent the build up of proteins on the surface of the packing material during use.

The result of this process is a dual zone reverse phase packing material having as an interior zone an ODS lipophilic partitioning phase of the type commonly used in reverse phase liquid chromatography to separate and quantify small molecules (e.g. drugs) in protein-containing biological matrices (e.g. blood serum or plasma). As with ISRP packing materials, an advantage of the present invention is that the lipophilic partitioning phase is located primarily in the interior zone of the porous support. As such, the lipophilic partitioning phase is protected from direct contact with proteins in the analyte by pore size exclusion, unlike typical ODS packings. On the other hand, unlike ISRP packing materials, an ODS partitioning phase is possible with the present invention.

The exterior zone contains the lipophobic phase which is mainly made up of fluorocarbon silyl groups which are less adsorptive to proteinaceous substances. The lipophobic phase is also preferably made up of ketal blocked diol or diol groups bonded to the external surface of the porous support. This further helps reject the proteins in the analyte and prevent fouling of the column and thereby extend the useful life of the dual zone reverse phase packing materials of the present invention.

Finally, if the optional end-capping step is undertaken, both the internal surface and the external surface of the porous support will have trimethylsilyl end-capping groups thereon. Such end-capping groups are relatively less adsorptive and as such are preferable to the residual hydroxyl groups of the porous support which might otherwise remain unreacted even after the three other silylation treatments of the preferred process.

Whether or not end-capping groups are present on the surfaces of the porous support, the dual zone reverse phase packing material of the present invention has been shown to display a reduced degree of serum protein absorption because the proteins are too large to enter the porous interior zone (where the ODS groups reside and provide substantial internal capacity for HPLC analysis of drugs in serum) and because the exterior zone of the packing material contains lipophobic end groups (fluorocarbon groups and ketal blocked diol or diol groups) which are less adsorptive to the proteins. The proteins pass through a column packed with the dual zone reverse phase packing materials of the present invention while smaller molecules, such as drugs and metabolites, penetrate the porous support and are retained and separated in the internal zone.

Accordingly, it is an object of the present invention to provide an improved reverse phase packing material, a pore diffusion control silylation method for making a dual zone reverse phase packing material and method for using the dual zone reverse phase packing material of the present invention. Other objects and advantages of the invention will become apparent from the following detailed description and the appended claims.

DETAILED DESCRIPTION OF THE PREFERRED EMBODIMENT

The porous support for the dual zone reverse phase packing materials of the present invention may be any porous solid having hydroxyl groups on its surface such as porous metalloid oxides, porous metallic oxides, and porous mixed metallic oxides. Such materials include silica, silica gel, alumina, stannia, titania, zirconia, and the like. However, normal HPLC packings are almost always silica particles or silica gels and therefore porous silica is the most preferred. Accordingly, the porous support will hereinafter be referred to as a porous silica. Preferably the pore diameter is 50 to 120 angstroms and most preferably around 60 angstroms. Preferably the particle size is 3 to 300 micro-meters and most preferably is 5 to 20 micro-meters.

As mentioned, the first step in the production of the dual zone reverse phase packing materials of the present invention is contacting the porous silica with a rapidly reacting fluorocarbon silane having the formula $L_mMe_{3-m}SiC_2H_4C_nF_{2n+1}$ wherein L is an alkyl sulfide. A substituted amino or N-methylacetamido, Me is methyl, n is 1 or more, and m is 1–3. Preferred is a perfluorobutyl silane, i.e. a silane containing $C_4F_9$; although $CF_3$, $C_2F_5$, $C_3F_7$, etc. could also be used. Preferably the "silane" portion of the fluorocarbon silane is an alkyl dimethyl silyl compound such as ethylene dimethylsilyl, i.e. $C_2H_4(CH_3)_2Si$. In order for the fluorocarbon silane to be "rapidly reacting", it may be compounded with a "leaving group" of the type disclosed in copending application Ser. No. 901,349. Three types of leaving groups are there described, viz: (i) disubstituted amides, (ii) trisubstituted amines, and (iii) thioethers. Preferred for the present invention are the disubstituted amides, particularly N-methylacetamide. A catalyst may be added to further accelerate and improve the degree of pore diffusion control.

Taking these preferred compound segments into consideration, i.e. a perfluorobutyl ($C_4F_9$) fluorocarbon component, a ethylenedimethylsilyl ($C_2H_4(CH_3)_2Si$) component, and an N-methylacetamide (NMeC(O)Me) leaving group, it should be apparent that the preferred long chain fluorocarbon silane is

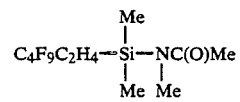

It may be used in an amount ranging from 0.05 to 0.8 $m/nM^2$, and preferably is contacted with the porous silica in an amount of about 0.4 $m/nM^2$, i.e. 0.4 molecules of fluorocarbon silane per square nanometer of surface area of the porous silica. Expressed in terms of silica weight this is approximately 0.2 millimoles of fluorocarbon silane per gram weight of porous silica having a surface area of 300 $M^2/g$. This reaction is preferably conducted in a non-polar dry solvent at reflux or in any event an elevated temperature. The silylating reagent is added sufficiently slowly over a period of 5 minutes to 12 hours, and preferably over one hour, to give a uniform dose of silylating reagent for each particle of the porous silica.

In the second step, then, the lipophilic partitioning phase is formed in the internal zone of the porous silica. As mentioned, the objective in this regard is to use an octadecylsilane (ODS), which is a known and accepted lipophilic partitioning phase for blood serum analysis, and to assure as much as possible that the ODS groups are located only on the internal surface of the porous silica.

This is accomplished with another silylation reaction with a compound having the formula $C_nH_{2n+1}Me_xSiL_{3-x}$ wherein $n+x \geq 5$, Me is methyl, and L is a halo group such as chloro, an amino group such as dimethylamino, an alkoxy such as diethoxy, an amido such as N-methylacetamido, or a carboxy such as acetoxy. Preferably it is an octadecyl silane. By octadecyl it is meant exactly that, namely $C_{18}H_{37}$. The "silane" component is preferably again an alkyl dimethyl silyl, where the octadecyl is the alkyl portion. Thus, $C_{18}H_{37}Me_2Si$ is the preferred silyl. As with the first step, the rest of the compound is preferably N-methyl acetamido (NMeC(O)Me). Thus, the preferred lipophilic silane is

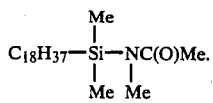

As will be apparent, the existence of the N-methyl acetamide "leaving group" on this compound makes it too a "rapidly reacting" silane. Use of such a rapidly reacting silane in the second step is somewhat contrary to the teachings of copending application Ser. No. 901,349, but is still possible (and in fact preferred) as long as less than a saturating amount is used and as long as it is used after many of the surface hydroxyls have already been converted to perfluorobutylsilyl groups by the first silylation step. Under those conditions, it has been found that the octadecylsilyl groups will form predominantly on the internal surfaces of the porous silica. Alternatively, a slow reacting lipophilic silane may be used as taught by copending application Ser. No. 901,349. The preferred octadecyl silane may be used in an amount ranging from 0.2 to 1.6 m/nM$^2$ and preferably the porous silica is contacted with an amount of about 0.4 m/nM$^2$ of octadecyldimethylsilyl-N-methylacetamide. Preferably the same reaction conditions set forth for step 1 are maintained.

Also because the octadecyl silane is used in less than a saturating amount, a number of residual silanols remain in the exterior zone. In order to further improve the life of the packing materials of the present invention, these silanols are replaced by relatively less adsorptive groups. Preferably this is done by adding ketal blocked diol groups. These may optionally be converted by hydrolysis to diol groups which have even less protein adsorptive characteristics. Again a dimethyl silyl-N-methylacetamide is the preferred silylating reagent for this step. However, in this case a ketal compound segment, such as

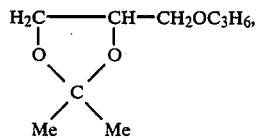

is used: Thus the preferred ketal silane is

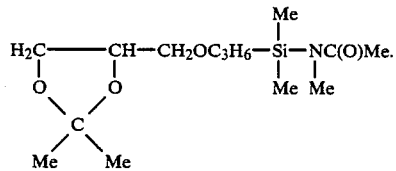

It may be used in a saturating amount, which can be assured by adding an excess, such as 2.0 m/nM$^2$. This may be added under reflux for a sufficient period of time to assure complete treatment of the accessible remaining silanols.

Despite the fact that three silylation reactions have taken place, a few reactable silanols may still remain on both the internal surface and external surface of the porous silica. Therefore, as an optional step, an end-capping reagent may be added to convert any undesirable residual silanols to less adsorptive trimethyl silyl groups. This is preferably done by contacting the porous silica with an excess of $((CH_3)_3Si)_2NH$, e.g. 2.0 m/nM$^2$. This should be done for a sufficient period of time to assure complete treatment of the accessible remaining silanols. As mentioned, this step is optional and may be omitted.

Another optional step is hydrolysis with, for example, 0.5 molar $H_2SO_4$ at room temperature for about 6 hours to cleave the ketal groups and form diol groups. Thus using the preferred ketal silane, and following hydrolysis, the diol groups would be:

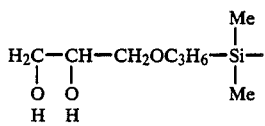

Diol groups of this type on the external zone of the porous silica further improve the lipophobic phase so that serum proteins are better rejected by the lipophobic phase resulting is less fouling of HPLC columns packed with the dual zone reverse phase packing materials of the present invention.

EXAMPLE I

Preparation of a dual zone packing material of the structure [PFB/ODS], KBD, TMS

Steps 1 and 2

Initially 7.00 g [$1.35 \times 10^{-2}$ eq @ 2.4 OH/nM$^2$] of vacuum-oven dried (16 hours @ 180° C.) Adsorbasil silica and 200 cc hexane were placed in a 500 cc, three-necked, greaseless baffled flask equipped with a N$_2$ sweep and the slurry sonicated 10 minutes to displace air from the pores of the silica. The flask was then equipped with an air-motor driven paddle, addition funnel, and a condenser topped with a drierite-protected N$_2$ sweep to exclude moisture during reaction. Thereafter 0.31 g (0.8 m/nM$^2$) imidazole was added and the mixture stirred for 10 minutes to allow the adsorption of imidazole onto the silica surface to attain a uniform distribution. The mixture was heated to reflux (69° C.) and at reflux a solution of 0.51 cc (0.70 g or 0.34 m/nM$^2$) of perfluorobutylethylenedimethylsilyl-N-methylacetamide (PFBA) in 100 cc hexane was added to the mixture over a 50 minute period with vigorous stirring. After 5 additional minutes at reflux, the flask was allowed to cool to room temperature. Then a solution of 1.75 g (0.906 m/nM$^2$) of $C_{18}H_{37}Me_2$-SiCl (ODSCl) dissolved in a 20 cc hexane was added and the mixture stirred at ambient for 1 hour. A small portion of the slurry was removed via syringe, isolated via filtration, washed twice with hexane, once with ethanol, thrice with diethyl ether, vacuum-oven dried 3 hours at 80° C., labeled "IA" and submitted for analysis.

Steps 3 and 4

Next 3.6 cc (3.2 g or 1.9 m/nM$^2$) of a ketal blocked diol (KBD) was added by syringe to the remaining slurry and the mixture heated to reflux.

The structure of KBD was

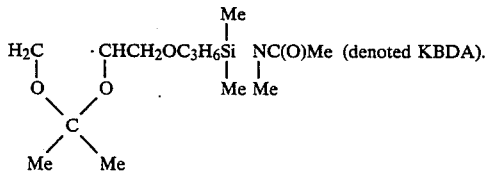

(denoted KBDA).

After 1 hour at reflux with stirring, 2.1 cc (1.9 g or 2.3 m/nM$^2$) of ((CH$_3$)$_3$Si)$_2$NH (TMSA) was added by syringe to end-cap residual reactive silanols that might not be sterically accessible to KBDA and the mixture refluxed 2 hours with stirring. The slurry was allowed to cool to room temperature and the treated silica was isolated by filtration and cleaned by successive washings, twice with hexane, once with hethanol, twice with diethyl ether, and twice with a 70/30 mixture of distilled water/ethanol. The treated silica was given three final washes with ether, vacuum-oven dried at 80° C. for 3 hours, and labeled "IB".

The treated silica labeled "IA" i.e. that produced following steps 1 and 2, gave a bulk analysis of 3.57 WT % F. and 11.08 WT % C., corresponding to average surface concentrations of 0.32 m/nM$^2$ of PFB and 0.58 m/nM$^2$ of ODS. External surface analysis by ESCA gave 0.652 F/Si corresponding to 0.70 m/nM$^2$ of PFB. Thus the material met both dual zone packing material criteria based on the concentration gradient of PFB.

Treated silica labeled "IB", i.e. that produced following completion of steps 3 and 4, gave a bulk analysis of 3.31 WT % F. and 15.05 WT % C., corresponding to average surface concentrations of 0.62 m/nM$^2$ of KBD, 0.58 m/nM$^2$ of ODS (assumed identical to that of "IA"), and 0.32 m/nM$^2$ of PFB. The small amount of TMS added to the surface in the final reaction step is not expected to impact significantly on the % C value due to the disparity in carbon contact of KBD vs. TMS and the scarcity of reactable silanol in the final step. External surface analysis by ESCA gave 0.633 F/Si, corresponding to 0.68 m/nM$^2$ of PFB. Thus this material met both criteria for a dual zone packing material based on the concentration gradient of PFB. The negligible change in the external PFB concentration relative to that of material "IA", showed that little change to the dual zone distribution occurred.

EXAMPLE II

Preparation of a [ODS/PFB], KBD, TMS structure

The procedure was similar to that of Example I with the following exceptions:

(1) Amicon silica was used.

(2) The ODSCl was added first as a solution with 20 cc hexane prior to any other silane addition and was added rapidly through the flask sideneck to the refluxing slurry, followed by a 1 hour reflux. At that point, 0.71 cc (0.98 g or 0.47 m/nM$^2$) of PFBA in 15 cc hexane was added over a 5 minute period via addition funnel. The mixture was allowed to cool to room temperature over a 30 minute period with stirring and then a small sample was withdrawn for analysis and washed as before. This sample was labeled "IIA".

The remainder of the material in the flask was reacted with KBDA, TMSA and washed in exactly the same way as in Example I and the final washed and dried product was labeled "IIB".

Treated silica "IIA" gave a bulk analysis of 1.36 WT % F. and 10.83 WT % C., corresponding to average surface concentrations of 0.62 m/nM$^2$ of ODS and 0.12 m/nM$^2$ of PFB. External surface analysis by ESCA gave 0.343 F/Si, corresponding to 0.37 m/nM$^2$ of PFB.

Treated silica "IIB" gave a bulk analysis of 1.49 WT % F. and 15.89 WT % C., corresponding to KBD average surface concentrations of 0.787 m/nM$^2$ of KBD, 0.62 m/nM$^2$ of ODS (assumed constant) and 0.15 m/nM$^2$ of PFB. External surface analysis by ESCA gave a value of 0.357 F/Si, corresponding to 0.34 m/nM$^2$ of PFB.

In summary, the composition of the product of Example II is very similar to that of Example I except that there is less of the lipophobic PFB group present, particularly in the external zone.

EXAMPLE III

The dual zone reverse phase packing material "IB" having lipophobic fluorocarbon groups (perfluorobutylethylenedimethylsilyl) (PFB) in the external zone and lipophilic silyl (octadecyldimethylsilyl) (ODS) in the internal zone was prepared as in Example I. The performance of material was tested and compared to a packing "IIB" having ODS groups bonded to the external surface and PFB bonded to the internal surface as prepared in Example II. In both packings the bulk density of the ODS groups is 0.6 m/nM$^2$ or 0.3 moles/g and that of the PFB was about 0.2 m/nM$^2$. The magnitude of the ODS level implies a useful adsorption strength by both materials. However with the PFB/ODS material, the highly adsorptive ODS group is shielded by reason of the fact the it resides within the porous internal zone.

The tables below show the amount of protein loss as measured by a reduction in the HPLC protein peak area from that of a configuration in which no packing for adsorption was present and as a function of repetitive injections of undiluted sheep serum. Usually just a single peak was seen: The column was being operated in a low resolution mode since the amount of surface area accessible to the large protein molecule is small compared to the amount of protein in each injection. Typically, the amount of loss declines with multiple injections: Previously adsorbed protein presents a relatively non-adsorbing surface that is only partially swept away by the flow of mobile phase before the next injection.

Table III A shows the protein loss data at a mobile phase composition of 10% IPA, 90% aqueous buffer. Note that the protein loss declines with each injection, but that the extent of loss is less for the "IB" (PFB/ODS) column at each injection. The greater loss for the "IIB" (ODS/PFB) column is due to a greater degree of adsorption of proteins on the external surface of the ODS packing material.

Table III B shows protein loss data at 20% IPA for the two columns. Again there is a clear trend for the "IB" (PFB/ODS) column to adsorb less protein than the converse column. Furthermore, the "IB" (PFB/ODS) column displays a constant rather than a variable amount of loss. This invariance suggests that one protein is being transiently adsorbed and the remainder are non-adsorbed at this IPA level. Gamma Globulin is a likely candidate since it is known to be more strongly adsorbed than the other major proteins and since it represents about 19% of the total ovine serum proteins. The trend of declining loss shown in the "IIB" (ODS/PFB) data is consistent with a greater degree of somewhat more permanent adsorption for that column.

Table III C shows loss data for the "IB" (PFB/ODS) column at various IPA levels in the mobile phase. It should be noted that initial loss declines with increasing IPA content. At 30% IPA, the loss data has not yet been normalized by obtaining a "columnless chromatogram", but it appears that a negligible amount of loss occurs in that case. This figure also reveals that the IPA level at which the greatest initial loss occurs ultimately affords the least loss. This paradoxical effect is probably due to a more irreversible adsorption of a greater range of the types of proteins which are present in serum. Such "irreversibility" by adsorption would be expected to occur at these very low IPA levels.

Protein loss is a key packing variable because adsorbed protein is ultimately responsible for curtailing the lifetime of HPLC columns for serum analysis. The adsorbed proteins at the pore mouths are thought to degrade the efficiency of the used column for small molecule separations by retarding access to the large internal surface.

As can be seen there are also operational advantages to preparative and process-scale use of reverse phase chromatography or even of simple adsorption if valuable small molecules can be extracted from a protein broth without fouling the adsorption media.

TABLE III A (Protein Loss at 10% IPA - Ovine Serum)

| No. of Injections | % Protein Loss "B" (PFB/ODS) | "IIB" (ODS/PFB) |
|---|---|---|
| 1 | 46 | 57 |
| 2 | 34 | 58 |
| 3 | 30 | 49 |
| 4 | 25 | 47 |
| 5 | 23 | 44 |
| 6 | 24 | 39 |
| 7 | 20 | 32 |
| 8 | 14 | 25 |

TABLE III B (Protein Loss at 20% IPA - Ovine Serum)

| No. of Injections | % Protein Loss "IB" (PFB/ODS) | "IIB" (ODS/PFB) |
|---|---|---|
| 1 | 14 | 26 |
| 2 | 14 | 29 |
| 3 | 15 | 28 |
| 4 | 17 | 14 |
| 5 | 16 | 16 |
| 6 | 16 | 11 |
| 7 | 18 | 22 |
| 8 | 15 | 22 |

TABLE III C (Protein Loss - Ovine Serum)
"IB" (PFB/ODS Column

| No. of Injections | 0% IPA | 10% IPA | 20% IPA |
|---|---|---|---|
| 1 | 81 | 46 | 16 |
| 2 | 55 | 34 | 14 |
| 3 | 31 | 30 | 15 |
| 4 | 23 | 25 | 17 |
| 5 | 16 | 23 | 16 |
| 6 | 11 | 24 | 16 |
| 7 | 7 | 20 | 18 |
| 8 | 4 | 14 | 15 |

Having described the invention in detail and by reference to the preferred embodiment thereof, it will be apparent that modifications and variations are possible without departing from the scope of the invention defined in the appended claims.

What is claimed is:

1. A method for making a dual zone reverse phase packing material for liquid chromatographic columns which comprises:
   (a) providing a hydroxyl-bearing porous support selected from the group consisting of porous metalloid oxides, porous metallic oxides and porous mixed metallic oxides,
   (b) contacting said porous support with less than a saturating amount of fluorocarbon silane which is capable of rapidly reacting with and covalently bonding to the hydroxyl groups on the external surface of said porous support under conditions sufficient to form a lipophobic phase comprising fluorocarbon groups in the external zone of said porous support wherein said fluorocarbon groups have the formula:

   $Me_{3-m}SiC_2H_4C_nF_{2n+1}$ wherein m is 1-3 and n is 1 or more.
   (c) thereafter, contacting said porous support with less than a saturating amount a lipophilic silane which is capable of diffusing into the interior of said porous support and covalently bonding to the hydroxyl groups on the internal surface of said porous support under conditions sufficient to form a lipophilic partitioning phase in the internal zone of said porous support, and
   (d) thereafter, contacting said porous support with a ketal silane under conditions sufficient to form ketal blocked diol groups on the external surface.

2. The method of claim 1 wherein said porous support is porous silica.

3. The method of claim 2 further including the step of contacting said porous silica with an end-capping reagent.

4. The method of claim 3 wherein said end-capping reagent is a trimethylsilyl reagent.

5. The method of claim 4 wherein said porous silica is contacted with 0.05–0.80 m/nM² of perfluorobutylethylenedimethylsilyl-N-methylacetamide, 0.2–1.6 m/nM² of octadecyldimethylsilyl-N-methylacetamide, an excess of $((CH_3)_3Si)_2NH$, and an excess of

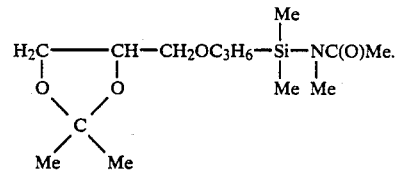

6. The method of claim 5 further including the step of contacting said porous silica with a hydrolyzing agent to hydrolyze said ketal blocked diol groups to diol groups.

7. The method of claim 2 further including the step of hydrolyzing said ketal blocked diol groups to diol groups.

8. The method of claim 2 wherein said lipophilic silane has the formula $C_nH_{2n+1}MeSiL_{3-x}$ wherein $n+x \geq 5$, Me is methyl, and L is selected from the group consisting of halo, amino, alkoxy, amido, and carboxy.

9. The method of claim 8 wherein said lipophilic silane is octadecyldimethylsilyl-N-methylacetamide.

10. The method of claim 2 wherein said fluorocarbon silane has the formula $$L_m Me_{3-m}SiC_2H_4C_nF_{2n+1}$$

wherein L is an alkyl sulfide, a substituted amino or N-methylacetamido, Me is methyl, n is 1 or more, and m is 1–3.

11. The method of claim 10 wherein said fluorocarbon silane is perfluorobutylethylenedimethylsilyl-N-methylacetamide.

12. The method of claim 2 wherein said ketal silane has the formula

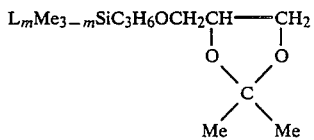

wherein L is chloro, a substituted amino or N-methylacetamido, Me is methyl, and m is 1–3.

13. The method of claim 12 wherein said ketal silane is

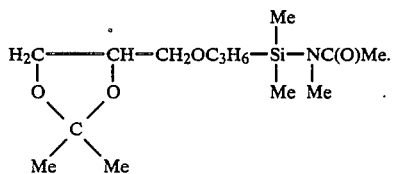

* * * * *